Patented Dec. 18, 1934

1,984,941

UNITED STATES PATENT OFFICE 1,984,941

DYESTUFFS OF THE BENZANTHRAQUINONE ACRIDINE SERIES AND METHOD OF MAKING THEM

Heinrich Neresheimer, Ludwigshafen - on - the - Rhine, Germany, assignor to General Aniline Works, Inc., New York, N. Y., a corporation of Delaware No Drawing. Application April 25, 1930, Serial No. 447,417. In Germany May 3, 1929

6 Claims. (Cl. 260—36)

The present invention relates to the production of dyestuffs of the 1,2-benzanthraquinones series.

I have found that new and valuable vat dyestuffs are obtained by causing condensing agents to act on anthraquinonyl-Bz4-amino-1,2-benzanthraquinones. The condensation may be effected by means of acid as well as alkaline condensing agents. A great variety of acid condensing agents such as concentrated or fuming sulphuric acid, chlorosulphonic acid, metal chlorides, for example aluminium chloride, ferric chloride, zinc chloride or mixtures of these chlorides, or compounds of these chlorides with other salts such as sodium-aluminium-chloride may be employed. The said acid condensing agents may also be used together with tertiary bases such as pyridine. As alkaline condensing agents may be mentioned especially alkali metal hydroxides, alcoholates or arylides. When effecting condensation by means of alkali metal hydroxides, phenols or alcohols are preferably added, which substances assist the wetting of the initial material and cause the reaction to proceed more smoothly. In many cases the alkaline condensing agents lead to other dyestuffs than the acid ones, but sometimes with acid agents the same dyestuffs are obtained as by the alkaline ones. Moreover, dyestuffs furnishing quite different shades are obtained according as to whether the anthraquinonyl-Bz4-amino-1,2-benzanthraquinone employed in unsubstituted or contains substituents. Thus for example α-anthraquinonyl - Bz4-amino-1,2-benzanthraquinone when heated with moderately dilute sulphuric acid solution or with a mixture of sodium chloride and aluminium chloride yields a clear yellow vat dyestuff, while from the same initial material a greenish blue vat dyestuff is obtained with aluminium chloride in the presence of a tertiary base as for example pyridine, or with fused potash. The products may be divided into two groups according to the shades of the dyeings obtained with them, namely the dyestuffs giving yellow to red dyeings and those giving blue to green dyeings. Theoretical considerations render it probable that the dyestuffs of both groups contain new heterocyclic rings which were not present in the initial materials, in the formation of which heterocyclic rings in the first group the carbon atom in the benzanthraquinonyl radicle in the ortho position to the imino group reacts and in the second group the carbon atom in the pera position to the imino group reacts. Thus for example, the condensation of the α - anthraquinonyl - Bz4-amino-1,2-benzanthraquinone having the Formula I, results, when carried out in the manner described in Example 1 hereinafter given, in a product which probably has one of the Formulæ II and III, while, when condensation is effected in the manner described in Examples 2, 3 and 7, products result which probably have the Formula IV:—

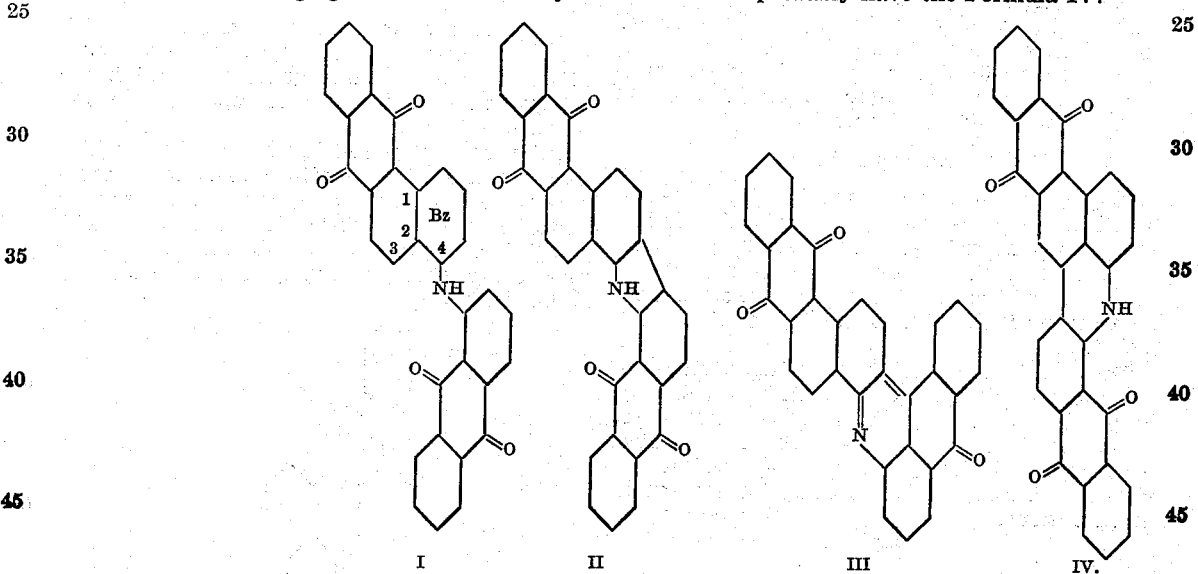

I  II  III  IV.

Products of the second type and therefore probably corresponding to the Formula IV are generally obtained by treating initial materials containing an acylamino group with acid condensing agents.

The following examples will further illustrate the nature of this invention, but the invention is not restricted to these examples. The parts are by weight.

*Example 1*

12.5 parts of water are allowed to flow into a solution of 10 parts of α-anthraquinonyl-Bz4- amino-1,2-benzanthraquinone (obtainable for example by condensation of Bz4-brom-1,2-benzanthraquinone with 1-aminoanthraquinone) in 100 parts of a 96 per cent solution of sulphuric acid, and the mixture is heated for about an hour at from 130° to 135° C. The crude dyestuff obtained by dilution with a large amount of water and washing the precipitate with water is preferably freed from impurities by boiling with a solution of sodium hypochlorite with the addition of sodium bicarbonate. The purified dyestuff dyes cotton clear yellow shades from a bluish red vat. The color of the solution of the dyestuff in concentrated sulphuric acid is red.

Apparently the same dyestuff is formed when the initial material specified in the first paragraph of this example is treated at about 150° C. with a mixture of sodium chloride and aluminium chloride, or with zinc chloride at about 200° C., whereas a brown olive dyeing product is obtained by means of potassium pyrosulphate at about 360° C.

Dyestuffs having similar tinctorial properties are obtained by employing the condensation product from Bz4-brom-1,2-benzanthraquinone and 1-amino-2-methylanthraquinone instead of the initial material hereinbefore described.

Example 2

10 parts of the initial material employed in paragraph 1 of Example 1 are introduced into a mixture, heated to from 220° to 230° C., of 30 parts of aluminium chloride and 10 parts of pyridine. The formation of the dyestuff is completed after a short period of time. The reaction mass is taken up with dilute hydrochloric acid and the grey green precipitate which separates out is filtered off. If desired it may be purified by dissolving it in boiling nitrobenzene the pure dyestuff separating out on cooling. The purified dyestuff is a blue green powder which dissolves in concentrated sulphuric acid giving a brown yellow coloration and dyes cotton blue green shades from a red violet vat.

Example 3

10 parts of α-anthraquinonyl-Bz4-amino-1,2-benzanthraquinone are introduced while stirring into a melt, heated to from 230° to 240° C., of 60 parts of potassium hydroxide and 20 parts of m-cresol, and the mass is stirred at the same temperature until the formation of dyestuff is completed.

The melt is then worked up in the usual manner and a crude dyestuff is obtained which may be purified for example by reprecipitation from its solution in boiling nitrobenzene. The purified dyestuff practically agrees with the dyestuff obtained in Example 2 as regards shade of color and reactions.

Example 4

10 parts of the condensation product from 1 molecular proportion of Bz4-brom-1,2-benzanthraquinone and 1 molecular proportion of 1,5-diaminoanthraquinone are treated as described in paragraph 1 of Example 1, and the dyestuff is purified as there described. The dyestuff yields powerful red dyeings from a bluish red vat.

Example 5

By introducing 10 parts of the initial material employed in Example 4, into a fused mixture of 60 parts of potassium hydroxide and 20 parts of m-cresol at from 210° to 220° C. and stirring the melt for a short time at the same temperature a dyestuff is obtained which yields bluish grey dyeings from a red vat.

The potash fusion may also be carried out without the addition of a phenol.

Example 6

A dyestuff similar to that described in Example 4 is obtained by treating the condensation product from 2 molecular proportions of Bz4-brom-1,2-benzanthraquinone and 1 molecular proportion of 1,5-diaminoanthraquinone in the manner described in Example 5.

Example 7

10 parts of the condensation product from 1 molecular proportion of Bz4-brom-1,2-benzanthraquinone and 1 molecular proportion of 1-amino-4-benzoylaminoanthraquinone are dissolved in 150 parts of chlorsulphonic acid at room temperature and the solution is stirred for several hours. After the formation of the dyestuff is completed the whole is poured into water and worked up in the usual manner. The new dyestuff is a dark green powder which dissolves in concentrated sulphuric acid giving a brown yellow coloration and which dyes cotton fast green shades from a red violet vat.

A similar dyestuff is obtained by the same treatment of the product obtained by condensation of Bz4-brom-1,2-benzanthraquinone and 1-amino-5-benzoylaminoanthraquinone. In order to ensure a smooth course of the reaction it is preferable to add pyridine or another tertiary base to the mixture.

What I claim is:—

1. A process of producing vat dyestuffs, which consists essentially in treating an anthraquinonyl-Bz4-amino-1,2-benzanthraquinone with a condensing agent.

2. A process of producing vat dyestuffs, which consists essentially in treating an anthraquinonyl-Bz4-amino-1,2-benzanthraquinone containing a benzoylamino group with an acid condensing agent.

3. A process of producing vat dyestuffs, which consists essentially in treating an anthraquinonyl-Bz4-amino-1,2-benzanthraquinone containing a benzoylamino group with chlorosulphonic acid.

4. Vat dyestuffs of the 1,2-benzanthraquinone series comprising the ring system corresponding to the formula:

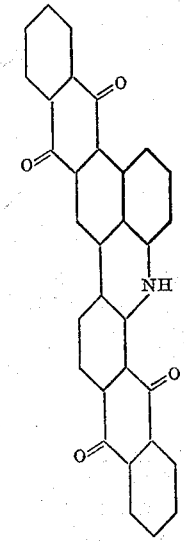

which may contain a substituent selected from the group consisting of methyl-, amino- and benzoylamino-substituents, which dyestuffs dissolve in concentrated sulphuric acid giving brown yellow solutions and dye cotton from red violet vats from green to blue green shades.

5. The vat dyestuff of the 1,2-benzanthraquinone series corresponding to the formula:

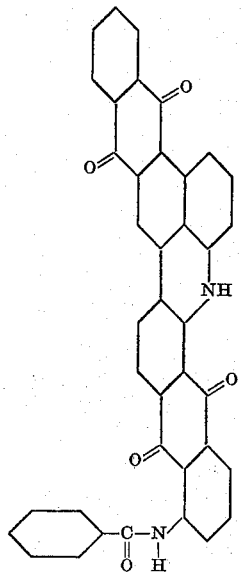

which dyestuff forms a green powder, dissolves in concentrated sulphuric acid giving a brown yellow coloration and dyes cotton from a red violet vat green shades.

6. Vat dyestuffs of the 1,2-benzanthraquinone series corresponding to the general formula

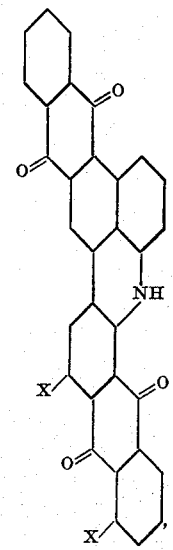

wherein one X stands for hydrogen or a benzoylamino group and the other X for hydrogen, which dyestuffs dissolve in concentrated sulphuric acid giving brown yellow solutions and dye cotton from red violet vats from green to blue-green shades.

HEINRICH NERESHEIMER.